(12) United States Patent
Peyton

(10) Patent No.: US 11,786,011 B2
(45) Date of Patent: Oct. 17, 2023

(54) SOLE STRUCTURE FOR AN ARTICLE OF FOOTWEAR HAVING HOLLOW POLYMERIC ELEMENTS AND METHOD OF MANUFACTURING SAME

(71) Applicant: NIKE, Inc., Beaverton, OR (US)

(72) Inventor: Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 749 days.

(21) Appl. No.: 16/800,329

(22) Filed: Feb. 25, 2020

(65) Prior Publication Data

US 2020/0187592 A1 Jun. 18, 2020

Related U.S. Application Data

(63) Continuation of application No. 14/851,854, filed on Sep. 11, 2015, now abandoned.

(60) Provisional application No. 62/086,222, filed on Dec. 2, 2014.

(51) Int. Cl.
| | |
|---|---|
| *B29D 35/12* | (2010.01) |
| *A43B 13/20* | (2006.01) |
| *A43B 13/18* | (2006.01) |
| *A43B 1/00* | (2006.01) |
| *A43B 13/14* | (2006.01) |

(52) U.S. Cl.
CPC ........... *A43B 13/20* (2013.01); *A43B 1/0072* (2013.01); *A43B 13/141* (2013.01); *A43B 13/189* (2013.01); *B29D 35/122* (2013.01)

(58) Field of Classification Search
None
See application file for complete search history.

(56) References Cited

U.S. PATENT DOCUMENTS

| | | | | |
|---|---|---|---|---|
| 4,252,910 A | * | 2/1981 | Schaefer | B68G 1/00 36/71 |
| 5,976,451 A | * | 11/1999 | Skaja | A43B 13/20 264/516 |
| 2002/0092199 A1 | * | 7/2002 | Fish | A43B 17/00 36/44 |
| 2013/0291409 A1 | * | 11/2013 | Reinhardt | B29D 35/142 36/43 |

(Continued)

FOREIGN PATENT DOCUMENTS

| | | |
|---|---|---|
| CA | 2656108 A1 | 1/2008 |
| CN | 1123004 A | 5/1996 |

(Continued)

*Primary Examiner* — Christopher T Schatz
(74) *Attorney, Agent, or Firm* — Quinn IP Law

(57) ABSTRACT

A sole structure for an article of footwear includes a sole component having a plurality of hollow polymeric elements in contact with one another or with binder between the hollow polymeric elements and fixed relative to one another. Each of the hollow polymeric elements defines a sealed, fluid-filled internal cavity capable of retaining fluid at a predetermined pressure. A method of manufacturing a sole structure for an article of footwear includes placing a plurality of hollow polymeric elements in contact with one another or with binder between the hollow polymeric elements, and fixing the plurality of hollow polymeric elements relative to one another to form a sole component. Each of the hollow polymeric elements has a sealed, fluid-filled internal cavity capable of retaining fluid at a predetermined pressure.

17 Claims, 10 Drawing Sheets

(56) References Cited

U.S. PATENT DOCUMENTS

2014/0223776 A1\* 8/2014 Wardlaw ................ A43B 13/04
36/102

FOREIGN PATENT DOCUMENTS

| CN | 101626704 A | 1/2010 |
| EP | 2196310 A3 | 6/2016 |

\* cited by examiner

SOLE STRUCTURE FOR AN ARTICLE OF FOOTWEAR HAVING HOLLOW POLYMERIC ELEMENTS AND METHOD OF MANUFACTURING SAME

CROSS-REFERENCE TO RELATED APPLICATIONS

This application is a continuation of and claims the benefit of priority to U.S. application Ser. No. 14/851,854 filed Sep. 11, 2015, which claims the benefit of U.S. Provisional Application No. 62/086,222 filed on Dec. 2, 2014, which is hereby incorporated by reference in its entirety.

TECHNICAL FIELD

The present disclosure relates to a sole structure for an article of footwear, and a method of manufacturing same.

BACKGROUND

Footwear typically includes a sole configured to be located under a wearer's foot to space the foot away from the ground or floor surface. Soles can be designed to provide a desired level of cushioning. Athletic footwear in particular sometimes utilizes resilient materials such as polyurethane foam in the sole to provide cushioning.

DETAILED DESCRIPTION

Figure 1:
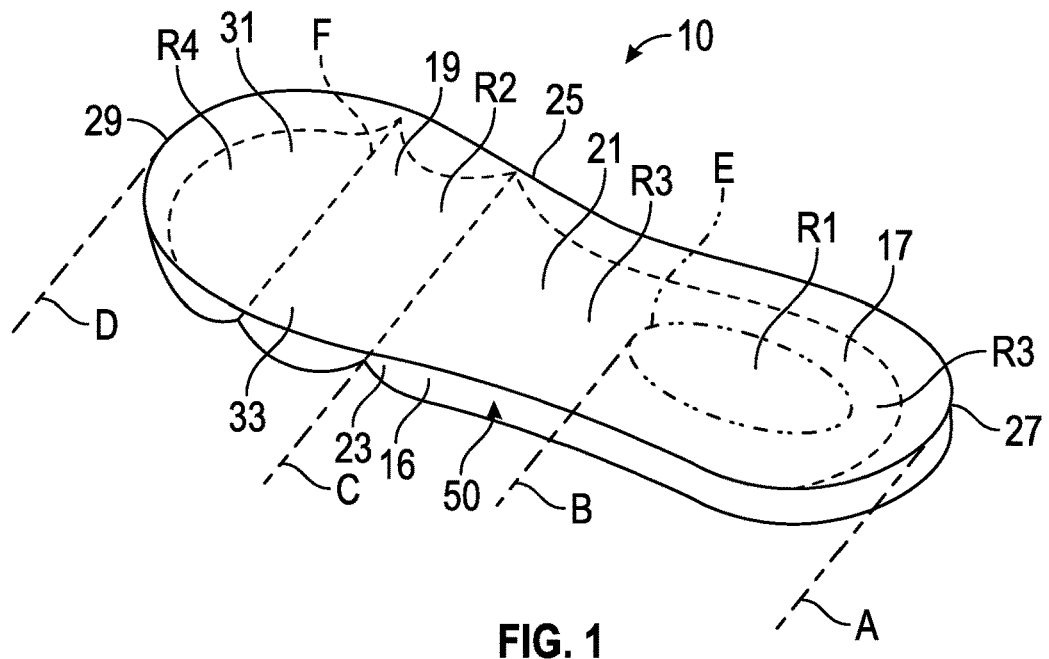
FIG. 1 is a schematic illustration in perspective view of a midsole for an article of footwear.

A sole structure for an article of footwear includes a sole component having a plurality of hollow polymeric elements in contact with one another or with binder between the hollow polymeric elements, and fixed relative to one another. Each of the hollow polymeric elements has a sealed, fluid-filled internal cavity capable of retaining fluid at a predetermined pressure. The fluid may be gas, and the gas may be present at the predetermined pressure in the fluid-filled internal cavities. In an embodiment, the predetermined pressure is less than or equal to ambient pressure. In an alternative embodiment, the predetermined pressure is greater than or equal to ambient pressure. For example, the predetermined pressure is from about 5 pounds per square inch (psi) to about 25 psi in one embodiment.

The hollow polymeric elements may comprise a thermoplastic polyurethane (TPU). The TPU may be present on at least an outer surface of the hollow polymeric elements. In an embodiment, each of the hollow polymeric elements is formed from a first polymeric sheet bonded to a second polymeric sheet. In an embodiment, each of the hollow polymeric elements is formed from at least one multi-layer polymeric sheet. Each multi-layer sheet may be a laminate membrane having at least a first layer comprising the TPU, and at least a second layer comprising a gas barrier polymer. In an embodiment, the hollow polymeric elements do not comprise an expanded material. For example, the gas barrier polymer is not expanded. In an embodiment, the gas barrier polymer comprises an ethylene-vinyl alcohol copolymer. In an embodiment, the at least a first layer consists essentially of the TPU, and the at least a second layer consists essentially of the ethylene-vinyl alcohol copolymer. In an embodiment, the sole component has a compression set of five percent or less.

In an embodiment, the TPU is an ultraviolet light-curable TPU and the plurality of hollow polymeric elements are fixed relative to one another by chemical bonds formed between outer surfaces of the hollow polymeric elements during an ultraviolet light curing process such that the chemical bonds fix the hollow polymeric elements relative to one another to retain a shape of the sole component.

In another embodiment, the hollow polymeric elements comprise a thermoplastic urethane, a polyurethane, a polyester, a polyester polyurethane, or a polyether polyurethane.

In an embodiment, the sole component further comprises a binder, and the hollow polymeric elements are fixed relative to one another at least in part by the binder. In one non-limiting example, the binder comprises a polymeric resin binder. For example, the polymeric resin binder may comprise at least one of a dimer fatty-acid based polyol binder or a dimer diol-based binder.

In an embodiment, the sole component is substantially translucent. For example, as used herein, "substantially translucent" means that the sole component has a luminous transmittance (i.e., a percentage of transmitted light to incident light) of at least 50 percent.

In an embodiment, a majority of the hollow polymeric elements may have a hardness of approximately 85 to 89 durometer on a Shore A scale.

The hollow polymeric elements may have any three-dimensional shape. In an embodiment, the hollow polymeric elements are substantially spherical. A majority of the hollow polymeric elements in a first region of the sole component can each have an outer diameter within a first range of diameters. A majority of the hollow polymeric elements in a second region of the sole component can each have an outer diameter within a second range of diameters. Diameters included in the first range of diameters are at least five percent larger than diameters included in the first range of diameters.

In an embodiment, the sole component also has a third region extending from the second region to the first region and at least partially surrounding a perimeter of the first region. A majority of the hollow polymeric elements in the third region have an outer diameter within a third range of diameters. Diameters included in the third range of diameters are at least five percent smaller than diameters included in the second range of diameters. The sole component may also have a fourth region forward of the second region. A majority of the hollow polymeric elements in the fourth region may have an outer diameter within the third range of diameters.

In an embodiment, each of the hollow polymeric elements of the sole component has an outer diameter from about 5 millimeters to about 8 millimeters. In another embodiment, the outer diameter of the hollow polymeric elements of the sole component ranges from about 8 mm to about 24 mm. For example, the sole component may be a midsole, and the first range of diameters in the first region is from about 8 mm to 24 mm, where 24 mm is the height of the midsole in the heel region, and the second range of diameters in the second region is from about 8 mm to about 12 mm, where 12 mm is the height of the midsole in the forefoot region 19.

In another embodiment, the midsole is configured so that the entire heel region has hollow polymeric elements with outer diameters from about 8 mm to about 24 mm, and the entire forefoot region and midfoot region have hollow polymeric elements with outer diameters from about 8 mm to about 12 mm. In one embodiment, all of the hollow polymeric elements in the heel region have an outer diameter of about 24 mm, and all of the hollow polymeric elements in the forefoot region and the midfoot region have an outer diameter of about 12 mm.

In an embodiment, the sole component has an outer surface with a groove. The groove is located between the first region and the second region. The first region may be a heel region and the second region may be a forefoot region.

A reinforcing element may be fixed to the hollow polymeric elements in the sole component. For example, the reinforcing element can be at least partially embedded within the sole component. The hollow polymeric elements can fix to the reinforcing element by binding to a surface of the reinforcing element, by fusing to a surface of the reinforcing element, or both. The reinforcing element may be all or part of an outsole. The sole component may comprise a cushioning element. The sole component may comprise a midsole, at least one of a footwear upper or an outsole may be fixed to the midsole, and the hollow polymeric elements can fix to the at least one of a footwear upper or an outsole by binding to a surface of the at least one of a footwear upper or an outsole, by fusing to a surface of at least one of a footwear upper or an outsole, or both.

A method of manufacturing a sole structure for an article of footwear includes placing a plurality of hollow polymeric elements in contact with one another or with binder between the hollow polymeric elements. Each of the hollow polymeric elements has a sealed, fluid-filled internal cavity capable of retaining fluid at a predetermined pressure. The method includes fixing the plurality of hollow polymeric elements relative to one another to form a sole component.

In an embodiment, placing the plurality of hollow polymeric elements in contact with one another comprises at least partially filling a cavity of a mold assembly with the hollow polymeric elements so that the hollow polymeric elements are in contact with one another. The cavity has a shape of a sole component, and the method may further comprise closing the mold assembly to compress the plurality of hollow polymeric elements. In such an embodiment, fixing the plurality of hollow polymeric elements relative to one another comprises fixing the plurality of hollow polymeric elements relative to one another by curing in the mold assembly when the mold assembly is closed. The method may then further include opening the mold assembly, and removing the sole component formed in the cavity from the hollow polymeric elements.

The method may include forming each of the hollow polymeric elements by any of thermoforming, blow-molding, compression molding, or extruding prior to placing the plurality of hollow polymeric elements in contact with one another. In an embodiment, forming each of the hollow polymeric elements is by thermoforming a first polymeric sheet and a second polymeric sheet to one another. Both the first and second polymeric sheets may be multi-layer polymeric sheets. Each of the multi-layer polymeric sheets may be a laminate membrane having at least a first layer comprising a thermoplastic polyurethane, and at least a second layer comprising a gas barrier polymer. In an embodiment, the gas barrier polymer comprises an ethylene-vinyl alcohol copolymer. In an embodiment, the at least a first layer consists essentially of the TPU, and the at least a second layer consists essentially of the ethylene-vinyl alcohol copolymer.

In an embodiment, forming each of the hollow polymeric elements further comprises inflating the internal cavity of each of the hollow polymeric elements to the predetermined pressure, and sealing the internal cavity of each of the hollow polymeric elements such that the internal cavity retains the fluid at the predetermined pressure. The fluid may be gas, and the gas may be present at the predetermined pressure in the fluid-filled internal cavities. In an embodiment, the predetermined pressure is less than or equal to ambient pressure. In an alternative embodiment, the predetermined pressure is greater than or equal to ambient pressure. For example, the predetermined pressure is from about 5 pounds per square inch (psi) to about 25 psi in one embodiment.

The method of manufacturing the sole structure for the article of footwear may be with the plurality of hollow polymeric elements that are any three-dimensional shape. In an embodiment, the hollow polymeric elements are substantially spherical. The hollow polymeric elements may include a first set of hollow polymeric elements a majority of which have an outer diameter within a first range of diameters, and a second set of hollow polymeric elements a majority of which have an outer diameter within a second range of diameters. Diameters included in the first range of diameters are at least five percent larger than diameters included in the second range of diameters. Filling the cavity may include filling a first portion of the cavity with the first set of hollow polymeric elements, and filling a second portion of the cavity with the second set of hollow polymeric elements.

The method of manufacturing the sole structure for the article of footwear may be with the plurality of hollow polymeric elements including a third set of hollow polymeric elements a majority of which have an outer diameter within a third range of diameters. Diameters included in the third range of diameters are at least five percent smaller than diameters included in the second range of diameters. Filling the cavity may include filling a third portion of the cavity with the third set of hollow polymeric elements.

In an embodiment, the cavity has a fourth portion forward of the second portion, and filling the cavity includes filling the fourth portion of the cavity with a fourth set of the hollow polymeric elements a majority of which have an outer diameter within the third range of diameters.

In an embodiment, the method of manufacturing the sole structure for the article of footwear may include adding a binder to the cavity. Fixing the hollow polymeric elements relative to one another is at least partially via the binder. The binder is may be added to the cavity before the plurality of hollow polymeric elements. Alternatively or in addition, the binder may be added to the cavity after the plurality of hollow polymeric elements have been added and are in contact with one another.

In an embodiment, fixing the hollow polymeric elements relative to one another under the method comprises exposing the cavity of the mold assembly filled with the plurality of hollow polymeric elements in contact with one another to ultraviolet light causing sufficient chemical bonds to form between the hollow polymeric elements such that after said curing, the fixed hollow polymeric elements retain the shape of the sole component.

In an embodiment, filling the cavity of the mold assembly may be over-filling so that closing the mold assembly compresses at least some of the polymeric elements to conform to the shape of the cavity. In other words, at least some of the hollow polymeric elements may deform.

In an embodiment, the method of manufacturing the sole structure for the article of footwear may include inserting a reinforcing element in the cavity of the mold assembly prior to closing the cavity such that the hollow polymeric elements are in contact with the reinforcing element. The hollow polymeric elements can fix to the reinforcing element by binding to a surface of the reinforcing element, by fusing to a surface of the reinforcing element, or both. The hollow polymeric elements can fix to the at least one of a footwear upper or an outsole by binding to a surface of the at least one of a footwear upper or an outsole, by fusing to a surface of at least one of a footwear upper or an outsole, or both.

In an embodiment, the sole component is a midsole, and the method further comprises inserting one of a footwear upper and an outsole in the cavity prior to closing the cavity.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Figure 2:
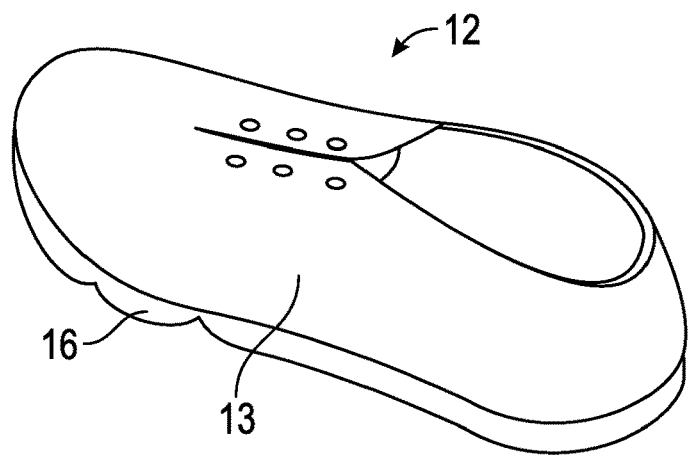
FIG. 2 is a schematic illustration in perspective view of an article of footwear having the midsole of FIG. 1 fixed to an upper.
Figure 3:
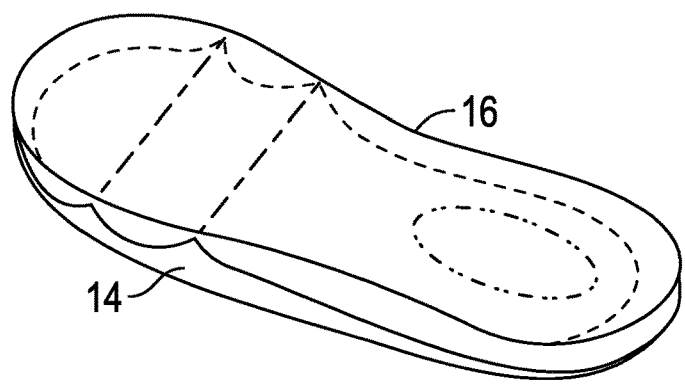
FIG. 3 is a schematic illustration in perspective view of an article of footwear having the midsole of FIG. 1 fixed to an outsole.

Referring to the drawings, wherein like reference numbers refer to like components throughout the views, FIG. 1 shows a sole structure 10 for an article of footwear 12, such as an article of footwear 12 in FIG. 2 that may include an upper 13, and may further include an outsole 14 as shown in FIG. 3. As shown in FIG. 1, the sole structure 10 includes a sole component 16 that can serve as a midsole to which an outsole 14 is fixedly attached, or as a unisole in which case the midsole 16 functions as both a midsole and an outsole, and may have outsole elements at high wear portions of a bottom surface. In the embodiments referred to herein, the sole component 16 is referred to as a midsole 16.

The midsole 16 has a heel region 17, a forefoot region 19, and a midfoot region 21 there between. Heel region 17 is also referred to herein as a first region and generally includes portions of the midsole 16 corresponding with rear portions of a human foot of a size corresponding with the midsole 16 and article of footwear 12, including the calcaneus bone. Forefoot region 19 is also referred to herein as a second region and generally includes portions of the midsole 16 corresponding with the toes and the joints connecting the metatarsals with the phalanges of the human foot of the size corresponding with the midsole 16 and article of footwear 12. Midfoot region 21 is also referred to herein as a third region and generally includes portions of the midsole 16 corresponding with an arch area of the human foot of the size corresponding with the midsole 16 and article of footwear 12. As used herein, a lateral side of a component for an article of footwear, such as a lateral side 23 of the midsole 16, is a side that corresponds with the side of the foot of the wearer of the article of footwear 12 that is generally further from the other foot of the wearer (i.e., the side closer to the fifth toe of the wearer). The fifth toe is commonly referred to as the little toe. A medial side of a component for an article of footwear, such as a medial side 25 of the midsole 16, is the side that corresponds with an inside area of the foot of the wearer and is generally closer to the other foot of the wearer (i.e., the side closer to the hallux of the foot of the wearer). The hallux is commonly referred to as the big toe.

In the embodiment of the midsole 16 shown in FIG. 1, the heel region 17 extends from a rear extremity 27 at boundary A to boundary B. In the embodiment shown, boundary B corresponds with a forward-most portion 235 of a first portion 230 of a mold cavity 206 of mold assembly 200 shown in FIG. 11 and used in manufacturing the midsole 16 as described herein. Midfoot region 21 extends from boundary B to boundary C. In the embodiment shown, boundary C is at a second ridge 214 of the mold portion 202 of mold assembly 200 of FIG. 11. Forefoot region 19 extends from boundary C to boundary D at a forward extremity 29 of the midsole 16. The forefoot region 19 is further divided into a toe region 31 (also referred to as a fourth region 31) and a metatarsal region 33 rearward of the toe region 31.

Figure 7:
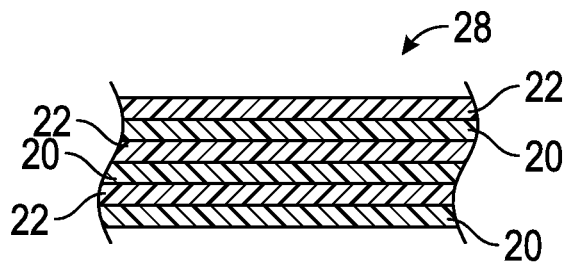
FIG. 7 is a schematic illustration in fragmentary cross-sectional view of a portion of a wall of the hollow polymeric element of FIGS. 5-6.
Figure 8:
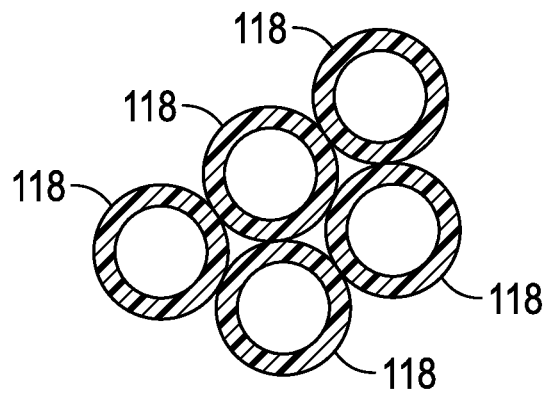
FIG. 8 is a schematic illustration in fragmentary cross-sectional view of alternative hollow polymeric elements for the midsole of FIG. 1.
Figure 9:
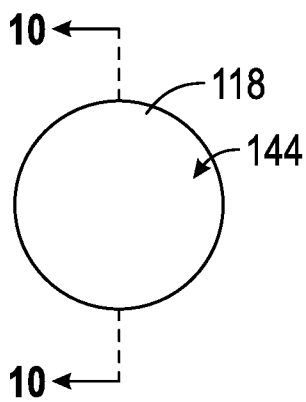
FIG. 9 is a schematic illustration in perspective view of one of the hollow polymeric elements of FIG. 8.
Figure 10:
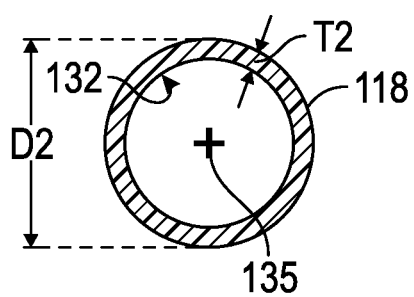
FIG. 10 is a schematic illustration in cross-sectional view of the hollow polymeric element of FIG. 9 taken at lines 10-10 in FIG. 9.

The midsole 16 is formed from a plurality of hollow polymeric elements fixed relative to one another. FIGS. 4-7 show one embodiment of hollow polymeric elements 18 that can be used to form the midsole 16. FIGS. 8-10 show another embodiment of hollow polymeric elements 118 that can be used to form the midsole 16. The hollow polymeric elements can have any three-dimensional shape and may be a combination of different shapes. The hollow polymeric elements of FIGS. 4-10 are shown as substantially spherical. As used herein, a hollow polymeric element is "substantially spherical" if substantially all of an inner surface of the internal cavity 24 is generally equidistant from a center of the internal cavity, such as within a five percent range of distances from the center. Additionally, a substantially spherical hollow polymeric element may include the flange 30. Hollow polymeric elements with other, non-spherical, three-dimensional shapes can be used instead of or in addition to substantially spherical hollow polymeric elements within the scope of the present teachings. Additionally, the hollow polymeric elements that are substantially spherical may deform in shape to conform to the shape of mated cavities 206, 208 or 206A, 208 of a mold assembly 200 or 200A, as explained herein, and retains the deformed shape in the formed midsole 16.

When formed, the midsole 16 is a unitary, integral component. Additionally, the various materials used for the elements 18, 118, as discussed herein, may be substantially translucent, so that the resulting midsole 16 is translucent and will appear so when incorporated in the article of footwear 12. In one embodiment, the midsole 16 may have a luminous transmittance (i.e., a percentage of transmitted light to incident light) of at least 50 percent. Those skilled in the art will readily understand a variety of methods to determine luminous transmittance of an object, such as midsole 16. For example, the luminous transmittance of the midsole 16 can be determined according to American Society for Testing and Materials (ASTM) Standard D1003-00, Standard Test Method for Haze and Luminous Transmittance of Transparent Plastics. Additionally, in some embodiments, the substantially translucent midsole 16 may be substantially clear or may have a tinted color.

The hollow polymeric elements 18, 118 can be formed from a variety of materials. In an embodiment shown and described at least with respect to FIGS. 8-10 and the method of FIG. 18, the hollow polymeric elements 118 are a monolayer of thermoplastic polyurethane (TPU). In other embodiments, such as shown and described with respect to FIGS. 4-7 and the method of FIG. 17, the hollow polymeric elements 18 are formed from various polymers that can retain a fluid at a predetermined pressure, including a fluid that is a gas, such as air, nitrogen, or another gas. For example, the hollow polymeric element 18 can be thermoplastic urethane, polyurethane, polyester, polyester polyurethane, and/or polyether polyurethane. Moreover, the elements 18 can be formed of layers of different materials. In an embodiment as illustrated in FIG. 7, which is a close-up fragmentary portion of the second sheet 28 of the sectioned hollow polymeric element 18 of FIG. 6, each hollow polymeric element 18 is a laminate membrane formed from thin films having one or more first layers 20 that comprise thermoplastic polyurethane layers 20 and that alternate with one or more second layers 22, also referred to herein as barrier layers, that comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The material of the barrier layer is not expanded. The first layer 20 may be arranged to form an outer surface of the hollow polymeric element 18. That is, the lowest layer 20 shown in FIG. 7 may be the outer surface of the hollow polymeric element 18 when the hollow polymeric element 18 is formed as described herein. The hollow polymeric elements 18 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The hollow polymeric elements 18 may also be a flexible microlayer membrane that includes alternating layers of a gas barrier material such as layers 22 and an elastomeric material such as layers 20, as disclosed in U.S. Pat. Nos. 6,082,025 and 6,127,026 to Bonk et al. which are incorporated by reference in their entireties. Additional suitable materials for the hollow polymeric elements 18 are disclosed in U.S. Pat. Nos. 4,183,156 and 4,219,945 to Rudy which are incorporated by reference in their entireties. Further suitable materials for the hollow polymeric elements include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the hollow polymeric elements, engineering properties such as tensile strength, stretch properties, fatigue characteristics, dynamic modulus, and loss tangent can be considered. The thicknesses of sheets of materials used to form the hollow polymeric elements 18, 118 can be selected to provide these characteristics.

Figure 5:
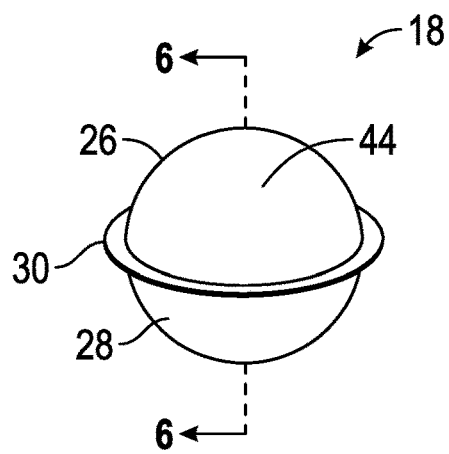
FIG. 5 is a schematic illustration in perspective view of one of the hollow polymeric elements of FIG. 4.
Figure 6:
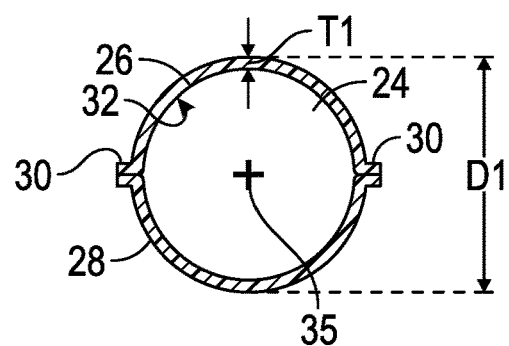
FIG. 6 is a schematic illustration in cross-sectional view of the hollow polymeric element of FIG. 5 taken at lines 6-6 in FIG. 5.

Referring to FIGS. 5 and 6, a single hollow polymeric element 18 having a wall thickness T1 and a diameter D1 formed from layers of different materials as described above defines a fluid-filled internal cavity 24. As used herein, a "fluid" includes a gas, including air, an inert gas such as nitrogen, or another gas. Accordingly, "fluid-filled" includes "gas-filled". The fluid-filled cavities 24 are sealed to retain the gas at a predetermined pressure that may be ambient pressure, below ambient pressure, or may be pressurized above ambient pressure to tune the resiliency and cushioning properties of the midsole 16. In one embodiment, the gas in each cavity 24 is at a predetermined pressure from about 5 psi to about 25 psi.

In an embodiment, the hollow polymeric element 18 is thermoformed from a first multilayer sheet 26 bonded by the thermoforming process to the second multilayer sheet 28 at a peripheral flange 30 to together form the internal cavity 24 between the bonded sheets 26, 28, and to generally provide the shape of a sphere. In an embodiment, the internal cavity 24 is filled with gas at a predetermined pressure from about 5 psi to about 25 psi and sealed to retain the gas at the predetermined pressure. In one embodiment, each of the hollow polymeric elements 18 or 118 in the midsole 16 may be formed from the same first multilayer sheet 26 and second multilayer sheet 28.

Figure 4:
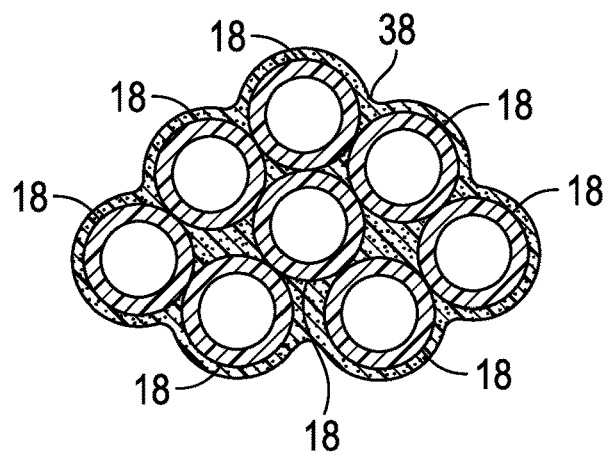
FIG. 4 is a schematic illustration in fragmentary cross-sectional view of hollow polymeric elements and binder of the midsole of FIG. 1.

As further explained herein, in one embodiment, when formed, a binder 38 shown in FIG. 4 sets to fix outer surfaces of the elements 18 to one another in the midsole 16. The binder 38 may be a polymeric resin binder. The polymeric resin binder may include, but is not limited to, a dimer fatty-acid based polyol binder, or a dimer diol-based binder, or both. The binder 38 can be between the hollow polymeric elements 18, and in an embodiment can coat outer surfaces of the hollow polymeric elements 18.

Alternatively, the hollow polymeric elements 18 may also be fixed relative to one another by fusing directly to one another. Stated differently, the thin wall of one hollow polymeric element 18 may be unitary with and joined directly with the thin wall of an adjacent hollow polymeric element 18. For example, the hollow polymeric elements 18 may be ultraviolet light curable, and may be cured by an ultraviolet light curing process that causes chemical bonds to form between outer surfaces of the hollow polymeric elements, fixing the hollow polymeric elements 18 relative to one another. The ultraviolet light curing process would be selected so that the ultraviolet light is of sufficient intensity and duration to cause sufficient chemical bonds to form between the hollow polymeric elements such that after said curing, the fixed hollow polymeric elements 18 retain the shape of the midsole 16. Some of the hollow polymeric elements 18 may be fixed to an adjacent hollow polymeric element 18 via the binder 38, and some may by fixed to an adjacent hollow polymeric element 18 by direct fusing.

The hollow polymeric elements 18 are compressible under applied force, such as pressure applied during use by a wearer of the article of footwear 12. The hollow polymeric elements 18 are resilient under the applied force such that after compression the hollow polymeric elements 18 return to their shape as formed in the mold assembly 200 or 200A, which may be, for example, a substantially spherical shape, or, for those hollow polymeric elements 18 deformed during forming in the mold assembly 200 or 200A may be a deformed shape The hollow polymeric elements 18, 118 are configured of suitable materials as described herein that do not experience compression set of more than five percent under repeated use. Compression set causes a permanent loss of resiliency after extensive use. Compression set is a percentage of an article's original thickness that remains permanently set after use. Foam midsoles experience compression set. A percentage compression set is a measure of the permanent deformation of a material such as foam after it has been compressed to a percentage of its original thickness for a controlled time period at a controlled temperature.

Figure 16:
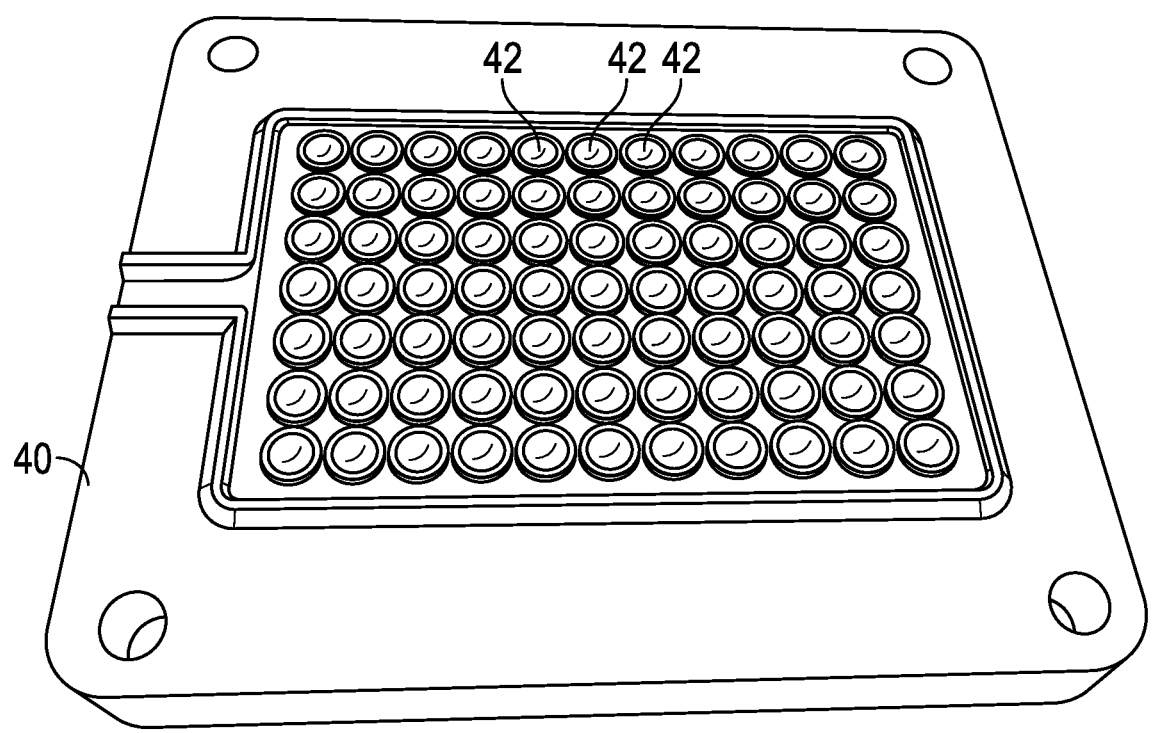
FIG. 16 is a schematic illustration in perspective view of a mold portion for forming the hollow polymeric elements of FIGS. 5-6.

The hollow polymeric elements 18 can be thermoformed in a mold assembly. FIG. 16 shows one example of a mold half 40 having numerous mold cavity portions 42. Another mold half substantially identical to mold half 40 can be secured to mold half 40 with the first and second sheets 26, 28 used to form the hollow polymeric elements 18 in their original generally flat form placed between the mold halves. A thermoforming process is then used to shape the sheets to the mold halves by the use of temperature and pressure control. Internal cavities 24 can be inflated with fluid, such as with gas at or above ambient pressure as discussed herein such as through conduits provided to the cavities 24 in the mold halves 40, and the cavities 24 sealed by the material of the hollow polymeric elements 18, such as at the flanges 30. The mold halves 40 are then separated, and excess material between the resulting hollow polymeric elements 18 is trimmed to separate the thermoformed hollow polymeric elements 18 from one another, leaving only the molded flange 30 extending from the otherwise spherical outer surface 44 shown in FIG. 5. The trimming process can be manual, or can be automated, with the use of a trimming die having relatively sharp circular cutouts that can surround each of the hollow polymeric elements 18 to cut through the bonded sheets 26, 28 and cut the hollow polymeric elements 18 at the flange 30.

In other embodiments, including embodiments in which the hollow polymeric elements are monolayer TPU hollow polymeric elements 118, a blow molding, compression molding, or extrusion process can be used to form the thin-walled, hollow polymeric elements 18 or 118 such as with wall thickness T2 and diameter D2 that can be the same or different than wall thickness T1 and diameter D1. In one embodiment the hollow polymeric elements 118 are a TPU material that has a hardness of approximately 85 to 89 durometer on a Shore A scale, as will be understood by those skilled in the art. In FIG. 8, the walls of adjacent hollow polymeric elements 118 are fused to one another so that the hollow polymeric elements 118 are fixed relative to one another. The hollow polymeric elements 118 can be a TPU that can be cured by ultraviolet light causing chemical bonds to form, as described above, to fuse the hollow polymeric elements 118 directly to one another without the use of binder. In FIGS. 9 and 10, the hollow polymeric elements 118 do not have a substantial flange, and so each has an outer surface 144 as well as an inner surface 132 that is substantially spherical.

Figure 11:
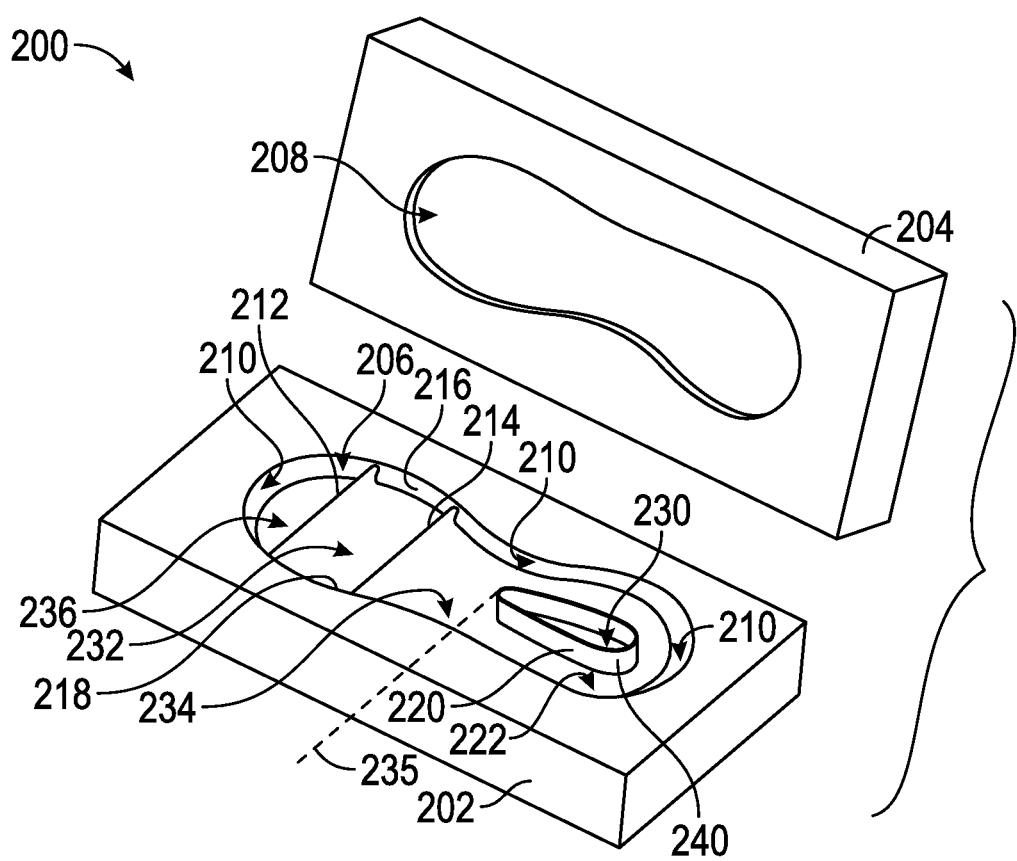
FIG. 11 is a schematic perspective illustration in exploded view of a mold assembly for the midsole of FIG. 1.
Figure 12:
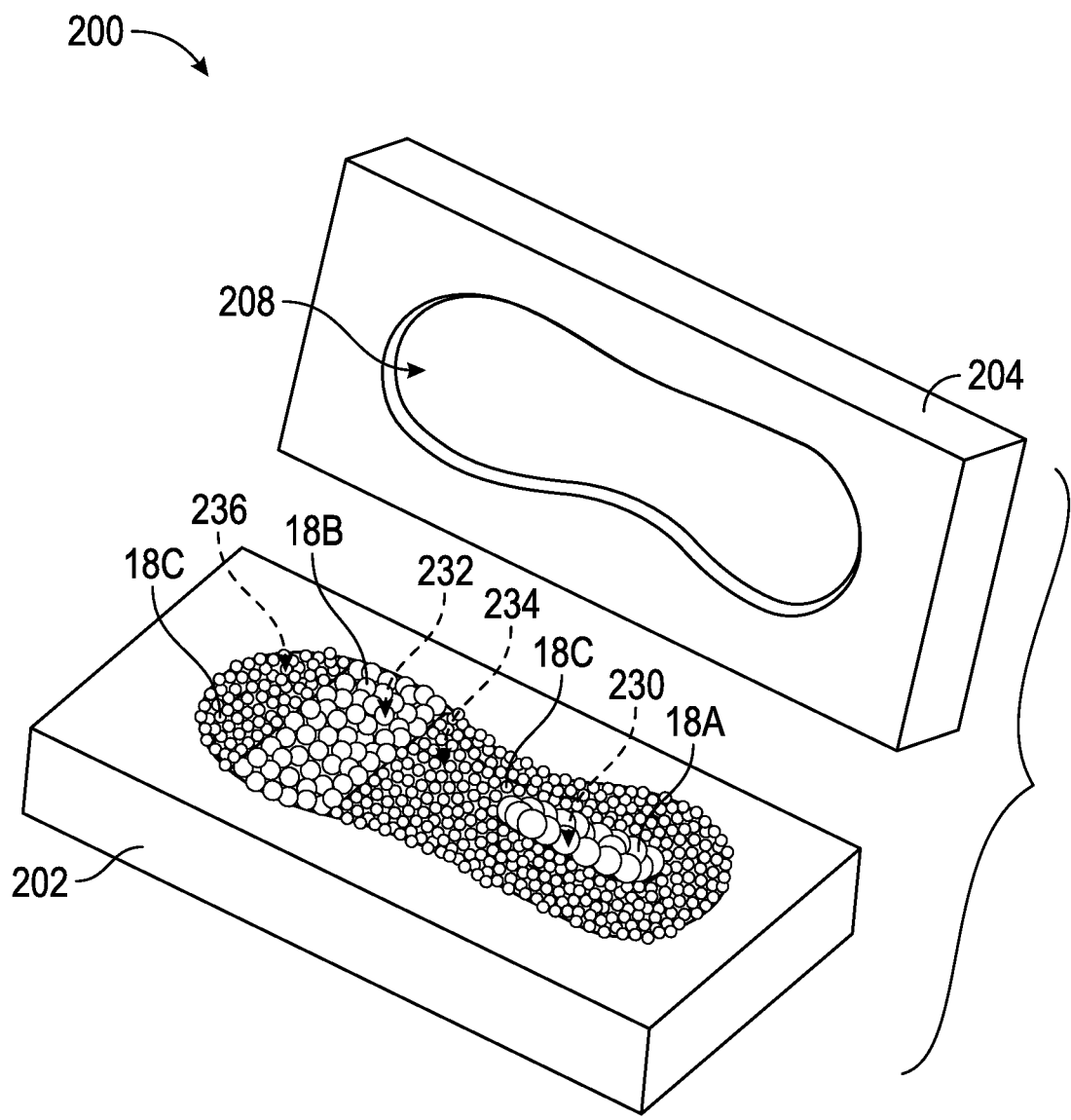
FIG. 12 is a schematic perspective illustration in exploded view of the mold assembly of FIG. 11 with a first mold portion over-filled with hollow polymeric elements.

FIGS. 11 and 12 show a mold assembly 200 used in manufacturing the midsole 16 of FIG. 1, or other sole component as described herein. The mold assembly 200 has a first mold portion 202 and a second mold portion 204 that can be secured to the first mold portion 202 by any suitable method known to those skilled in the art to close a mold cavity having the shape of the midsole 16. Specifically, the first mold portion 202 has a first mold cavity 206 to which a second mold cavity 208 of the second mold portion 204 generally mates when the mold assembly 200 is closed so that the resulting cavity (i.e., the mated cavities 206, 208) has the shape of the midsole 16. The mold portions 202, 204 can be silicone mold portions or can be of a different suitable material.

The first mold cavity 206 has a peripheral surface 210 configured to provide a peripheral surface 50 of the midsole 16. The first mold portion 202 forms or is provided with inserts that form a first ridge 212 and a second ridge 214 both generally extending from a medial side 216 to a lateral aside 218 of the first mold cavity 206. Additionally, a barrier 220 extends upward from a surface 222 of the first mold portion 202 at a bottom of the mold cavity 206. The barrier 220 and the first and second ridges 212, 214 are configured to effectively divide the first mold cavity 206 into a first portion 230, a second portion 232, a third portion 234, and a fourth portion 236. As illustrated in FIG. 11, the third portion 234 extends rearward from the second ridge 214 and surrounds the outer perimeter 240 of the barrier 220.

The second mold cavity 208 is a generally flat recess that serves as a mold for the top portion of the midsole 16. When the first mold portion 202 and the second mold portion 204 are closed together, the second mold cavity 208 extends over the entire first mold cavity 206.

The first mold portion 202 with the ridges 212, 214 and the barrier 220 as described enable the midsole 16 to be formed from hollow polymeric elements, such as substantially spherical hollow polymeric elements, of different outer diameters in different regions of the midsole 16. In other embodiments, the first mold portion 202 can have no ridges or barriers and can be filled with hollow polymeric elements 18 or 118 as described, or a mix of hollow polymeric elements 18, 118, that have approximately the same outer diameter throughout. In still further embodiments, the first mold portion 202 can have no ridges or barriers and can be filled with hollow polymeric elements 18 or 118 as described, or a mix of hollow polymeric spheres 18, 118, that can have different diameters interspersed with one another throughout the midsole 16 rather than divided into regions.

Referring to 12, the first portion 230 is shown over-filled with a first set of hollow polymeric elements 18A identical to either hollow polymeric elements 18 or 118 as described, and a majority of which have an outer diameter within a first range of diameters. In one non-limiting example, the first range of diameters may be from about 9.5 mm to about 10.5 mm. As used herein, a "majority" means more than half. The second portion 232 is over-filled with a second set of hollow polymeric elements 18B that are identical to either hollow polymeric spheres 18 or 118 as described, and a majority of which have an outer diameter within a second range of diameters. The diameters included in the first range of diameters are at least five percent larger than diameters included in the second range of diameters. In one non-limiting example, the second range of diameters may be from about 7.5 mm to about 8.5 mm. The third portion 234 is over-filled with a third set of hollow polymeric elements 18C identical to either hollow polymeric elements 18 or 118 as described, and a majority of which has a third range of diameters.

Diameters included in the third range of diameters are at least five percent smaller diameters included in the second range of diameters. In one non-limiting example, the third range of diameters may be from about 5.5 mm to about 6.5 mm. The fourth portion 236 is also filled with a fourth set of the hollow polymeric elements identical to either hollow polymeric elements 18 or 118 as described, and a majority of which and preferably each of which has an outer diameter within the third range of diameters such as a range from about 5.5 mm to about 6.5 mm. Accordingly, because the fourth set has the same range of diameters as the third set, the hollow polymeric elements of the fourth set are referenced as hollow polymeric elements 18C.

In another non-limiting example, the outer diameter of the hollow polymeric elements 18 or 118 of the midsole 16 ranges from about 8 mm to about 24 mm. For example, with respect to FIG. 12, the first range of diameters in the first portion 18A is from about 8 mm to about 24 mm, where 24 mm is the height of the midsole 16 in the heel region 17, and the second range of diameters in the second portion 232 is from about 8 mm to about 12 mm, where 12 mm is the height of the midsole 16 in the forefoot region 19. Accordingly, the first range of diameters in the first region R1 is from about 8 mm to 24 mm, where 24 mm is the height of the midsole 16 in the heel region 17, and the second range of diameters in the second region R2 is from about 8 mm to about 12 mm, where 12 mm is the height of the midsole 16 in the forefoot region 19

In another non-limiting example, the midsole 16 is configured so that the entire heel region 17 of FIG. 1 has hollow polymeric elements 18 or 118 with outer diameters from about 8 mm to about 24 mm, and the entire forefoot region 19 and midfoot region 21 have hollow polymeric elements 18 or 118 with outer diameters from about 8 mm to about 12 mm. In one embodiment, all of the hollow polymeric elements 18 or 118 in the heel region 17 have an outer diameter of about 24 mm, and all of the hollow polymeric elements 18 or 118 in the forefoot region 19 and the midfoot region 21 have an outer diameter of about 12 mm.

As used herein, "over-filled" means that the mold assembly 200 or 200A, or a portion of the mold assembly is filled with a volume of hollow polymeric elements 18 or 118 so that closing the mold assembly 200 or 200A requires pressure and compresses at least some of the hollow polymeric elements 18 or 118 to conform to the shape of the mated cavities 206, 208. In other words, at least some of the hollow polymeric elements 18, 118 may be deformed in the manufactured midsole 16. For example, in FIG. 12, the volume of the hollow polymeric elements 18A, 18B, 18C shown in the mold assembly 200 requires pressure to close the mold assembly 200, and causes at least some of the hollow polymeric elements 18A, 18B, 18C to deform. By over-filling the mold assembly 200 or 200A, the hollow polymeric elements 18A, 18B, 18C are compressed to fit into the mold assembly 200 or 200A under load when the mold assembly 200 or 200A is closed. Thus, additional pressure is required to close the mold assembly 200 or 200A than would be required if the mold assembly 200 or 200A were not over-filled. This provides a high density of hollow polymeric elements 18A, 18B, 18C, a high surface contact ratio between the contacting hollow polymeric elements in embodiments where outer surfaces of the hollow polymeric elements 18A, 18B, 18C contact one another, and/or requires less binder 38 in embodiments in which binder is used and binds to outer surfaces of the hollow polymeric elements to fix the hollow polymeric elements 18A, 18B, 18C relative to one another.

The midsole 16 manufactured from the hollow polymeric elements 18A, 18B, 18C arranged in the mold cavity 206 as described will have different regions with different levels of compressibility and resiliency that provide a different underfoot feel. Generally, regions formed from hollow polymeric elements 18 or 118 having a relatively small outer diameter will have less compressibility and resiliency than regions formed from hollow polymeric elements having a relatively large outer diameter, assuming that all spheres are of approximately the same wall thickness and at the same internal pressure (whether ambient or above ambient).

Specifically, referring to FIGS. 1 and 11, the midsole 16 manufactured using the mold assembly 200 filled with the various hollow polymeric elements 18A, 18B, 18C as described has a first region R1 corresponding with first portion 230 and bounded by a boundary E that corresponds with the barrier 220. The midsole 16 has a second region R2 corresponding with the second portion 232 and bounded by boundary C, which is coincident with second ridge 214, and boundary F which is coincident with first ridge 212. The midsole 16 has a third region R3 corresponding with the third portion 234 and that surrounds the first region R1 and is rearward of the second region R2. The midsole 16 has a fourth region R4 that is forward of the second region R2 and corresponds with the fourth portion 236.

Figure 13:
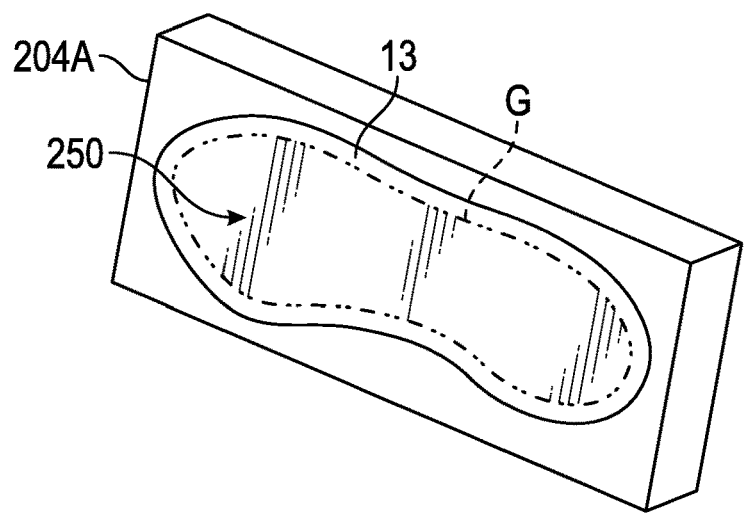
FIG. 13 is a schematic illustration in perspective view of an alternative second mold portion holding an upper of an article of footwear and for use with the first mold portion of FIG. 11.

FIG. 13 shows an alternative second mold portion 204A that can be used in place of second mold portion 204. The second mold portion 204A is configured to retain a bottom portion of the upper 13. The upper 13 can be multiple pieces, or can be a one-piece upper configured to be cut and folded to form a contoured upper, and the mold portion 204A can be configured to retain such a one-piece upper. When the mold portion 204A with upper 13 is closed over the mold portion 202 containing the hollow polymeric elements 18 and/or 118, optionally arranged as 18A, 18B, 18C as shown in FIG. 12, the resulting midsole 16 will form to the upper 13 with the hollow polymeric elements 18, 118 fixing to the bottom surface 250 of the upper 13 during manufacturing, either by the binder 38 setting to the surface 250, or by the hollow polymeric elements 18 and/or 118 fusing to the surface 250, or both. The portion of upper 13 bound by phantom line G indicates the surface 250 to which the midsole 16 will affix.

Figure 14:
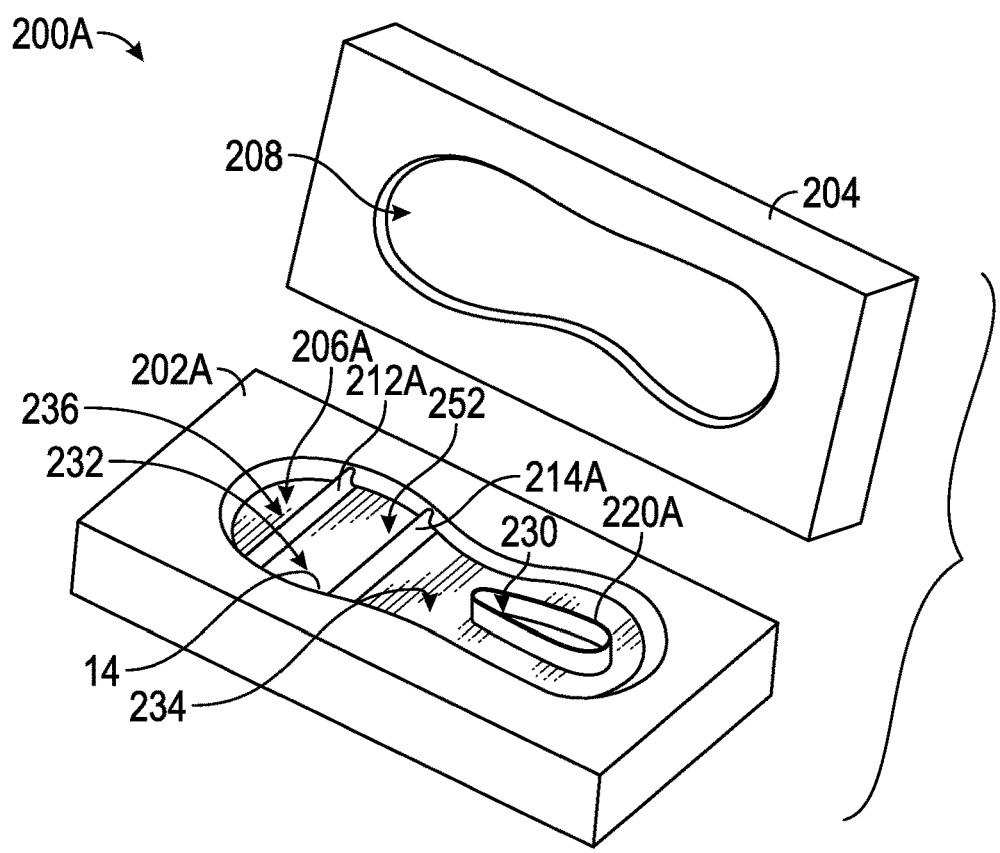
FIG. 14 is a schematic perspective illustration in exploded view of an alternative mold assembly for the midsole and outsole of FIG. 3.

FIG. 14 shows shows an alternative mold assembly 200A with a first mold portion 202A that can be used in place of first mold portion 202. The first mold portion 202A is configured to retain the outsole 14 at the bottom of a mold cavity 206A slightly deeper than mold cavity 206. Mold inserts 212A, 214A, 220A generally shaped like first and second ridges 212, 214 and barrier 220, respectively, then overlay the outsole 14 prior to filling the mold cavity 206A with the hollow polymeric elements 18 and/or 118. Alternatively, the outsole 14 can be retained in a third mold portion configured to abut the first mold portion 202 with the bottom of the mold cavity 206 opening to the outsole 14 in the third mold portion. In the embodiment of FIG. 14, when the mold portion 204 is closed over the mold portion 202A with outsole 14 and with the hollow polymeric elements 18 and/or 118 poured over the outsole 14 in the mold cavity 206A, and optionally arranged as 18A, 18B, 18C as shown in FIG. 12, the resulting midsole 16 will form to the outsole 14, with the hollow polymeric elements 18 and/or 118 fixing to the upper surface 252 of the outsole 14, either by the binder 38 setting to the surface 252, or the hollow polymeric elements 18 and/or 118 fusing to the surface 252, or both.

Figure 15:
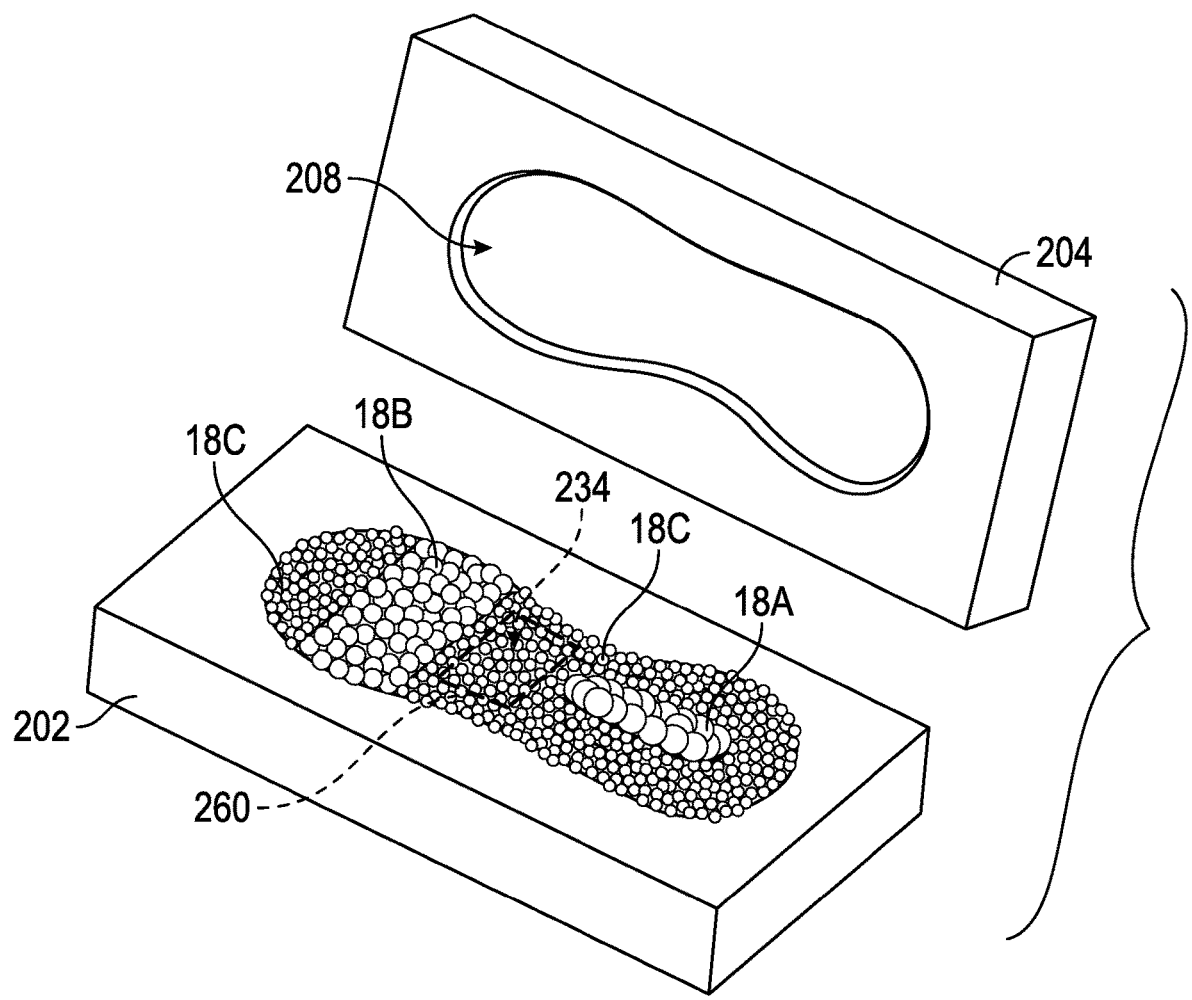
FIG. 15 is a schematic perspective illustration in exploded view of the mold assembly of FIG. 11 with the first mold portion over-filled with hollow polymeric elements and containing an inserted support member.

FIG. 15 shows an inserted reinforcing element 260 that can be of a thermoplastic elastomer or other suitable material placed in the third portion 234 of the mold cavity 206 and in contact with the hollow polymeric elements 18C. The reinforcing element 260 is shown having a plate-like shape. In other embodiments, the inserted reinforcing element 260 can have a different shape, can be in another portion of the mold cavity 206, or multiple inserted reinforcing elements 260 can be placed in the mold cavity 206. The reinforcing element 260 can be completely surrounded by the hollow polymeric elements 18C such that the reinforcing element 260 is embedded in the hollow polymeric elements 18C, or the reinforcing element 260 can rest above or below the hollow polymeric elements 18C in the third portion 234. As shown, the reinforcing element 260 is completely surrounded on all surfaces by the hollow polymeric elements 18C prior to forming the midsole 16 so that the resulting midsole 16 will be identical to midsole 16 of FIG. 1 except with the inserted reinforcing element 260 embedded in the third region R3.

Figure 17:
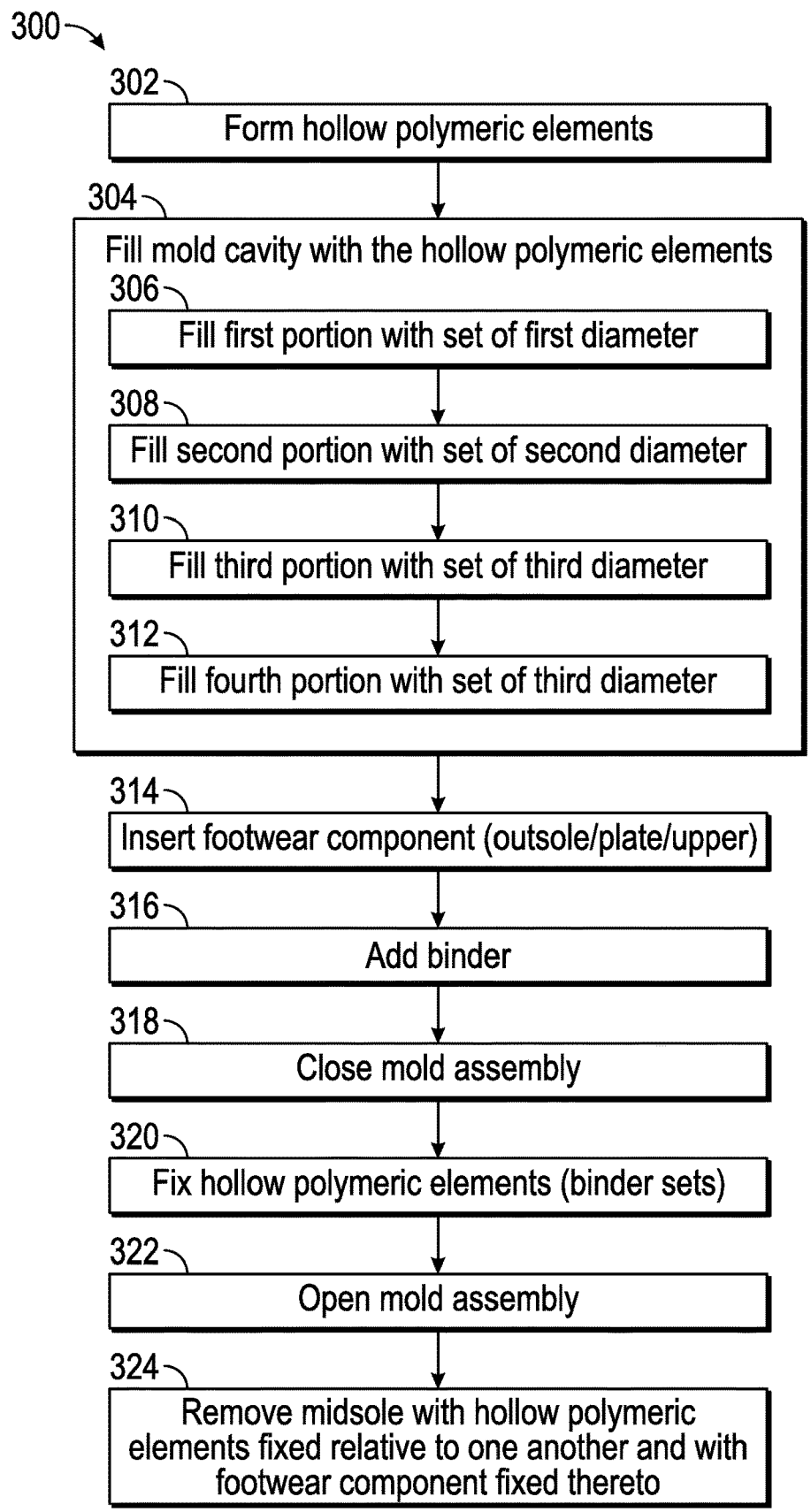
FIG. 17 is a flow diagram of a first method of manufacturing a sole component for an article of footwear.

FIG. 17 is a flow diagram of a first method 300 of manufacturing a sole structure for an article of footwear. The method 300 can include step 302, forming the hollow polymeric elements 18 or 118 by thermoforming, extruding, compression molding, or blow molding as described herein and as understood by those skilled in the art. Forming the hollow polymeric elements 18, 118 can include inflating the internal cavities 24 with fluid, such as gas, including an inert gas such as nitrogen or air, and then sealing the cavities 24. The gas can pressurize the internal cavities 24 to a predetermined pressure. The predetermined pressure can be equal to or greater than ambient pressure. The predetermined pressure can be from about 5 psi to about 25 psi. In other embodiments, the internal cavities 24 can be filled with and retain gas at a predetermined pressure that is less than or equal to ambient pressure.

The method 300 then proceeds to step 304. Alternatively, if the hollow polymeric elements 18 or 118 are obtained in a pre-formed state, the method 300 begins at step 304. In other words, the same entity carrying out step 302 to form the hollow polymeric elements 18 or 118 can carry out the remainder of the method 300, or a separate entity can obtain the formed hollow polymeric elements 18 or 118 and carry out the remainder of the method 300.

In step 304, the mold cavity 206 or 206A is filled with the hollow polymeric elements 18 and/or 118, such as by pouring the hollow polymeric elements 18 and/or 118 into the mold cavity 206 or 206A. As described herein, filling the mold cavity 206 or 206A in step 304 may be over-filling as described herein so that the hollow polymeric elements 18 and/or 118 are compressed and at least some of the hollow polymeric elements 18 or 118 deform when the mold assembly 200 or 200A is closed.

Optionally, under the method 300, different portions of the mold cavity 206 or 206A are filled with hollow polymeric elements 18 and/or 118 having outer diameters of different sizes as described with respect to hollow polymeric elements 18A, 18B, 18C, shown in FIG. 12. Accordingly, in one embodiment, step 304 can include sub-steps 306, 308, 310, and 312. In sub-step 306, the first portion 230 of the mold cavity 206 or 206A is over-filled with hollow polymeric elements 18A of a first outer diameter. In sub-step 308, the second portion 232 of mold cavity 206 or 206A is over-filled with hollow polymeric 18B of a second outer diameter. In sub-step 310, the third portion 234 of mold cavity 206 or 206A is over-filled with hollow polymeric 18C of a third outer diameter. In sub-step 312, the fourth portion 236 of mold cavity 206 or 206A is over-filled with hollow polymeric 18C of the third outer diameter. As discussed with respect to FIGS. 11, 12, and 14, other variations of hollow polymeric elements of different diameters can be used, the entire mold cavity 206 or 206A can be filled with hollow polymeric of the same diameter, or hollow polymeric elements of different diameters can be mixed together such that they are not segregated into different portions of the mold cavity 206 or 206A.

If desired, a sole component such as midsole 16 manufactured under the method 300 can be fixed to an additional footwear component, such as an outsole 14, an upper 13, and/or an inserted reinforcing element 260 as described with respect to FIGS. 13-15. Accordingly, the method 300 may optionally include step 314, inserting a footwear component in the mold cavity 206 or 206A. Step 314 may occur before or after step 304, or may occur when step 304 is partially complete, such as by inserting the reinforcing element 260 when the mold cavity 206 is partially filled with the hollow polymeric elements 18 or 118, and then completing the filling step 304 with the hollow polymeric elements 18, 118 poured over the inserted reinforcing element 260.

Either before of after the hollow polymeric elements 18 and/or 118 and any additional footwear components 13, 14, 260 are arranged in the mold portions 202, 202A, 204, or 204A as described, the method 300 may include step 316, adding binder 38 to the mold cavity 206 or 206A. The mold assembly 200 is then closed in step 318. Because the mold cavity 206 or 206A may be overfilled in step 304, closing the mold cavity 206 or 206A may cause the hollow polymeric elements 18 or 118 to be compressed. Step 320, fixing the hollow polymeric elements 18 and/or 118 relative to one another then occurs by curing while the mold assembly 200 is closed. If binder 38 is used, the hollow polymeric elements 18 and/or 118 may be fixed in step 320 simply by waiting a predetermined period of time for the binder to set, if binder 38 was added in optional step 316. Alternatively or in addition, pressure and temperature within the mold cavity 206 or 206A may be controlled in step 320 to cause the hollow polymeric elements 18 and/or 118 to be fixed relative to one another by the binder 38. If a footwear component such as upper 13, outsole 14, and/or inserted reinforcing element 260 was inserted into the mold assembly 200 or 200A in optional step 314, then the footwear component 13, 14, and/or 260 will also be affixed to the midsole 16 and thereby fixed relative to the hollow polymeric elements 18 and/or 118 in step 320.

Next, the mold assembly 200 or 200A is opened in step 322. In step 324, the midsole 16 is removed from the mold assembly 200 or 200A with the sole component 13, 14, and/or 260 fixed thereto if inserted in optional step 314.

Figure 18:
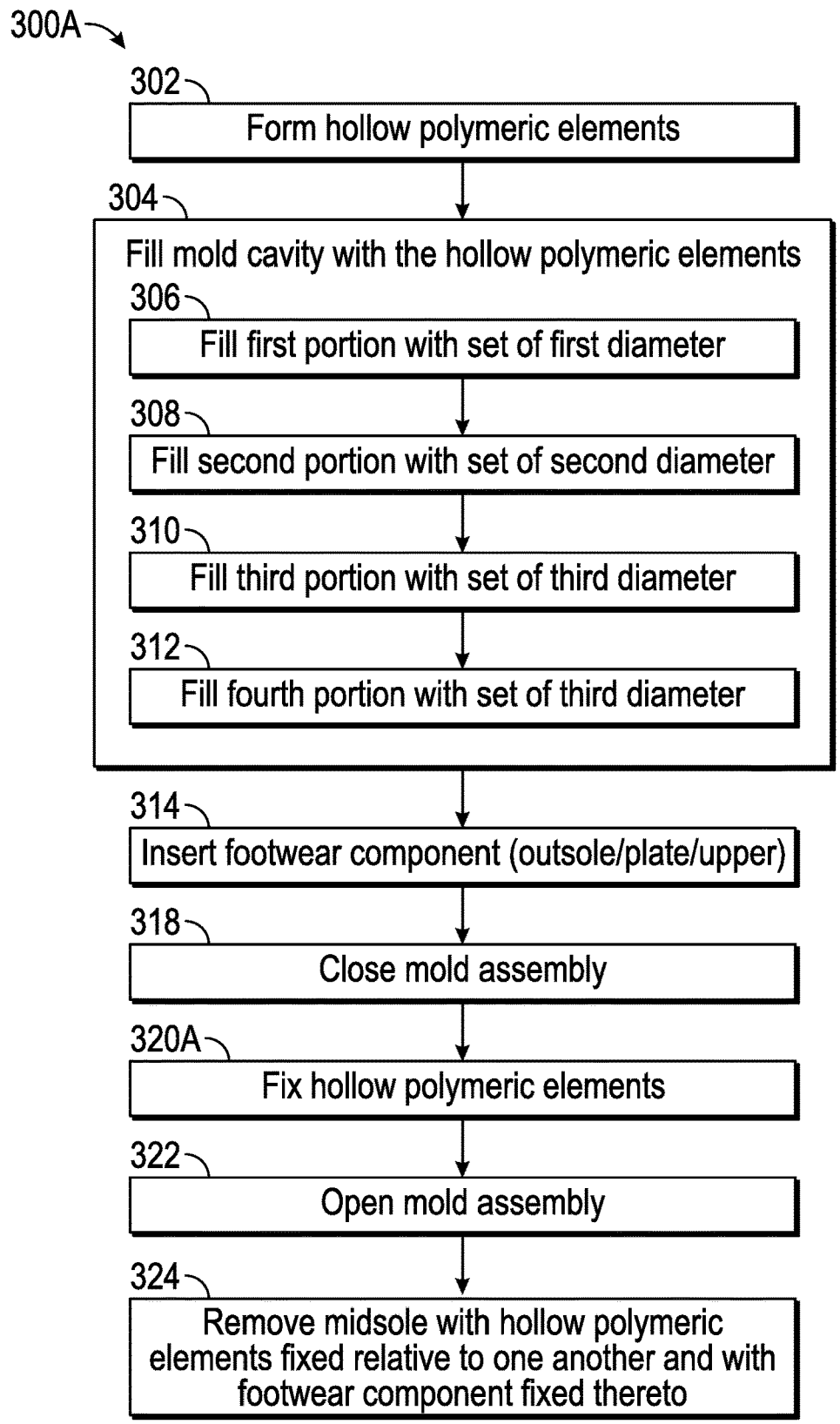
FIG. 18 is a flow diagram of a second method of manufacturing a sole component for an article of footwear.

FIG. 18 is a flow diagram of a method 300A of manufacturing a sole component for an article of footwear. The method 300A is alike in many aspects to method 300, and steps that can be identical to those in method 300 are indicated with like reference numbers and are the same as described with respect to method 300. The method 300A can be used if the hollow polymeric elements 18 or 118 are of a material such that they can be fused to one another, and no binder is required. Accordingly, step 316 is not included in method 300A. Accordingly, step 320A in which the hollow polymeric elements 18 or 118 are fixed relative to one another in the closed mold assembly 200 or 200A is by fusing the hollow polymeric elements 18 or 118 directly to one another, such as by curing with ultra-violet light causing sufficient chemical bonds to form to fix outer surfaces of the hollow polymeric elements 18 or 118 to one another so that the hollow polymeric elements 18 or 118 retain the shape of the sole component, such as the midsole 16 (i.e., the shape of the mated cavities 206, 208 or 206A, 208). In other embodiments, binder may also be added. Under the method 300A, if a reinforcing element or other component is inserted in the mold cavity 206 or 206A, the sole component may be of a material that will also fuse to the hollow polymeric elements 18 or 118 if ultraviolet curing is used in step 320A. Additionally, an adhesive may be applied to the sole component prior to closing the mold assembly 200, 200A.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. A method of manufacturing a sole structure for an article of footwear comprising:
adding binder to a mold cavity;
at least partially filling the mold cavity of a mold assembly with hollow polymeric elements so that the hollow polymeric elements are in contact with the binder between the hollow polymeric elements; wherein each of the hollow polymeric elements has a sealed, fluid-filled internal cavity capable of retaining fluid at a predetermined pressure and the mold cavity has a shape of a sole component; wherein the hollow polymeric elements do not comprise an expanded material;
inserting an outsole into the mold cavity;
closing the mold assembly; and
fixing the hollow polymeric elements relative to one another and to the outsole via the binder by curing the hollow polymeric elements in the mold assembly while the mold assembly is closed, the hollow polymeric elements forming a sole component; wherein the binder is between and coats outer surfaces of the hollow polymeric elements.

2. The method of manufacturing of claim 1, the method further comprising:
opening the mold assembly; and
removing the sole component and the outsole fixed thereto from the mold assembly.

3. The method of manufacturing of claim 1, wherein:
the mold assembly includes a first mold portion and a second mold portion; and
said at least partially filling the mold cavity of the mold assembly with the hollow polymeric elements is by over-filling the first mold portion with the hollow polymeric elements so that closing the mold assembly compresses at least some of the hollow polymeric elements to conform to the shape of the mold cavity.

4. The method of manufacturing of claim 1, wherein:
said at least partially filling the mold cavity of the mold assembly with hollow polymeric elements is by pouring the hollow polymeric elements over the outsole after inserting the outsole in the mold assembly.

5. The method of manufacturing of claim 4, further comprising:
placing a mold insert into the mold cavity over the outsole prior to pouring the hollow polymeric elements over the outsole; and
wherein the mold insert at least partially divides the mold cavity.

6. The method of manufacturing of claim 5, wherein said at least partially filling the mold cavity of the mold assembly with the hollow polymeric elements is by pouring different sets of the hollow polymeric elements into different regions of the mold cavity, the different regions separated by the mold insert, and the different sets having different ranges of outer diameters.

7. The method of manufacturing of claim 1, further comprising:
placing a mold insert into the mold cavity prior to the at least partially filling the mold cavity with the hollow polymeric elements; wherein the mold insert at least partially divides the mold cavity; and
wherein said at least partially filling the mold cavity of the mold assembly with the hollow polymeric elements is by pouring different sets of the hollow polymeric elements into different regions of the mold cavity, the different regions separated by the mold insert, and the different sets having different ranges of outer diameters.

8. The method of manufacturing of claim 1, wherein:
the mold assembly includes a first mold portion and a second mold portion configured to close to the first mold portion to close the mold cavity;

said at least partially filling the mold cavity of the mold assembly with the hollow polymeric elements is by at least partially filling the first mold portion with the hollow polymeric elements;

said inserting the outsole into the mold cavity includes inserting the outsole in the first mold portion; and said fixing the hollow polymeric elements relative to one another and to the outsole includes fixing the hollow polymeric elements relative to an upper surface of the outsole.

9. The method of manufacturing of claim 1, further comprising:

forming each of the hollow polymeric elements by any of thermoforming, blow-molding, compression molding, or extruding prior to at least partially filling the mold cavity of the mold assembly with the hollow polymeric elements.

10. The method of manufacturing of claim 9, wherein said forming is by thermoforming a first polymeric sheet and a second polymeric sheet to one another.

11. The method of manufacturing of claim 10, wherein both the first and second polymeric sheets are multi-layer polymeric sheets.

12. The method of manufacturing of claim 11, wherein each of the multi-layer polymeric sheets is a laminate membrane having at least a first layer comprising a thermoplastic polyurethane and at least a second layer comprising a gas barrier polymer.

13. The method of manufacturing of claim 12, wherein the gas barrier polymer is an ethylene-vinyl alcohol copolymer.

14. The method of manufacturing of claim 9, wherein said forming each of the hollow polymeric elements further comprises:

inflating the internal cavity of each of the hollow polymeric elements with fluid to the predetermined pressure; and sealing the internal cavity of each of the hollow polymeric elements such that the internal cavity retains the fluid at the predetermined pressure.

15. The method of manufacturing of claim 1, wherein the binder is added to the mold cavity before the hollow polymeric elements.

16. The method of manufacturing of claim 1, wherein the mold assembly has a ridge separating different portions of the mold cavity and a groove is defined in the sole component.

17. The method of manufacturing of claim 1, wherein a groove is defined in the sole component.

* * * * *